US012606722B1

(12) United States Patent
　　Calvo

(10) Patent No.: US 12,606,722 B1
(45) Date of Patent: Apr. 21, 2026

(54) NESTED MASKING TAPE ROLLS

(71) Applicant: In-Tuition LLC, Holualoa, HI (US)

(72) Inventor: Robert Paul Calvo, Holualoa, HI (US)

(73) Assignee: In-Tuition LLC, Holualoa, HI (US)

( * ) Notice: Subject to any disclaimer, the term of this
patent is extended or adjusted under 35
U.S.C. 154(b) by 0 days.

(21) Appl. No.: 19/093,796

(22) Filed: Mar. 28, 2025

(51) Int. Cl.
　　*C09J 7/00* (2018.01)
　　*B65H 18/28* (2006.01)

(52) U.S. Cl.
　　CPC .............. *C09J 7/00* (2013.01); *B65H 18/28*
　　(2013.01); *B65H 2701/1722* (2013.01); *B65H*
　　*2701/19404* (2013.01); *C09J 2301/18*
　　(2020.08); *C09J 2301/206* (2020.08)

(58) Field of Classification Search
　　CPC .... C09J 7/00; C09J 2301/18; C09J 2301/206;
　　B65H 18/28; B65H 2701/1722; B65H
　　2701/19404; Y10T 428/14
　　See application file for complete search history.

(56) References Cited

U.S. PATENT DOCUMENTS

| | | | | | |
|---|---|---|---|---|---|
| 2,694,533 | A | * | 11/1954 | Zucker | B65H 35/0026 |
| | | | | | 242/588.6 |
| 2,725,142 | A | * | 11/1955 | Davis | B65D 85/672 |
| | | | | | 206/414 |
| 4,355,720 | A | | 10/1982 | Hofberg | |

| | | | | | |
|---|---|---|---|---|---|
| 6,767,629 | B2 | * | 7/2004 | Shah | B65H 75/00 |
| | | | | | 428/350 |
| 10,682,661 | B2 | | 6/2020 | Sarajian | |
| 11,472,985 | B1 | * | 10/2022 | Hunnicutt | C09J 7/22 |
| 2003/0096076 | A1 | * | 5/2003 | Allison | C09J 7/20 |
| | | | | | 428/43 |
| 2004/0028867 | A1 | | 2/2004 | Allison | |
| 2010/0059162 | A1 | | 3/2010 | Flanigan | |
| 2011/0168827 | A1 | * | 7/2011 | Cooper | B65H 35/002 |
| | | | | | 242/160.4 |
| 2019/0359391 | A1 | * | 11/2019 | Trueax | B65H 35/0026 |
| 2023/0332018 | A1 | | 10/2023 | Kohlmeier | |

FOREIGN PATENT DOCUMENTS

| | | | | |
|---|---|---|---|---|
| DE | 19907991 | A1 | 8/2000 | |
| DE | 19907992 | A1 * | 8/2000 | C09J 7/20 |
| EP | 0357627 | A1 | 3/1990 | |
| EP | 0548395 | A1 * | 6/1993 | B65H 75/00 |
| GB | 2415646 | A | 1/2006 | |
| WO | WO-8909129 | A1 * | 10/1989 | C09J 7/20 |
| WO | 2000029225 | A1 | 5/2000 | |
| WO | 2014071362 | A1 | 5/2014 | |

OTHER PUBLICATIONS

Machine translation of DE-19907992-A1 (Year: 2000).*

* cited by examiner

*Primary Examiner* — Patricia L. Nordmeyer
(74) *Attorney, Agent, or Firm* — Baker Botts L.L.P.

(57) ABSTRACT

A tape package comprises a cylindrical roll core having an outer surface and an interior space; a first roll of an adhesive tape wound on the outer surface of the cylindrical roll core; and a second roll in the interior space, the second roll comprising a plurality of adhesive tape rectangles on a non-adhesive backing.

20 Claims, 7 Drawing Sheets

104

204

202

100

406

408

402

404

410

108

102

104

106

NESTED MASKING TAPE ROLLS

FIELD OF THE DISCLOSURE

One technical field of the present disclosure is product packaging, devices, and systems with masking tape in pre-cut and uncut forms. Another technical field is product packaging, devices, and systems with nested masking tape or painter's tape rolls.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Masking tape and painter's tape typically are produced and sold in rolls. The rolls may include a center cylinder formed from cardboard, paper, or plastic with a single, long, continuous strip of tape wrapped around the center cylinder. The single strip of tape can be peeled away from other underlying parts of the tape roll and cut to varying lengths as needed when the tape is used. For example, a strip of masking tape or painter's tape may be torn from or cut off the roll and placed along the edge of a surface to be painted. The tape may protect an adjacent surface from paint or other materials.

Certain surfaces may require a precise, squared edge when painting, staining, or finishing. For example, corners of walls and ceilings, windowpanes, skirting boards, and coving or molding may have straight edges and corners with precise angles, and the neatest and most effective masking occurs when tape applied in these areas matches the edges or corners. However, measuring or estimating the angle of a cut when cutting a piece of tape off a roll may be time-consuming and usually is inaccurate, requiring repetitive applications of multiple tape pieces until the desired coverage is achieved.

Rolls of masking tape or painter's tape may be bulky. Carrying multiple rolls of masking tape or painter's tape along with paint brushes and other painting tools may be burdensome or inconvenient, especially when painting difficult-to-reach or elevated areas.

Similarly, stocking multiple rolls of masking or painter's tape and other painting tools in a retail environment may require valuable shelf space that could be used to stock other inventory.

Based on the foregoing, the referenced technical fields have developed an acute need for pre-measured or cut tape. The referenced technical fields have also developed an acute need for efficiently packed tape and painting tools.

SUMMARY

The appended claims may serve as a summary of the invention.

DETAILED DESCRIPTION

1. General Overview

Figure 1A:
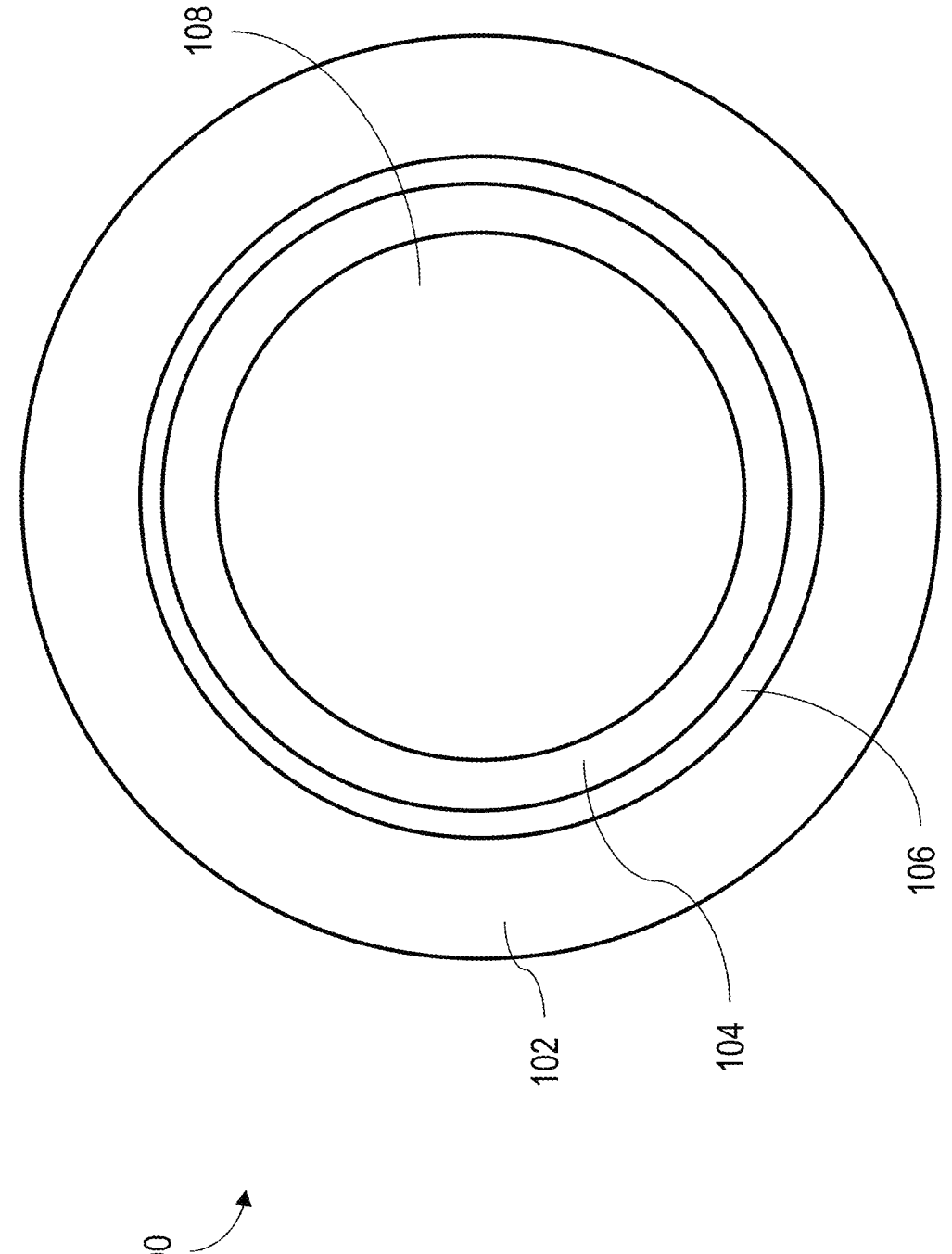
FIG. 1A illustrates a side view of nested tape rolls in an embodiment.

The details of one or more embodiments of the subject matter described in this specification are outlined in the accompanying drawings and the description below. Other potential features, aspects, and advantages of the subject matter will become apparent from the description, the drawings, and the claims. In the following description, details are set forth by way of example to facilitate discussion of the disclosed subject matter. However, it should be apparent that the disclosed embodiments are exemplary and only exhaustive of some possible embodiments.

Embodiments encompass the subject matter of the following numbered clauses:

1. A tape package comprising: a cylindrical roll core having an outer surface and an interior space; a first roll of an adhesive tape wound on the outer surface of the cylindrical roll core; and a second roll in the interior space, the second roll comprising a plurality of adhesive tape rectangles on a non-adhesive backing.

2. The tape package of clause 1, wherein each adhesive tape rectangle among the plurality of adhesive tape rectangles are squares.

3. The tape package of clause 2, wherein the first roll of an adhesive tape has a first width, and each adhesive tape rectangle among the plurality of adhesive tape rectangles has a second width that is the same as the first width.

4. The tape package of clause 3, wherein each adhesive tape rectangle among the plurality of adhesive tape rectangles is spaced apart from another adhesive tape rectangle among the plurality of adhesive tape rectangles.

5. The tape package of clause 3, wherein each adhesive tape rectangle among the plurality of adhesive tape rectangles is separated from another adhesive tape rectangle among the plurality of adhesive tape rectangles by perforations.

6. The tape package of clause 1, wherein the interior space has a diameter, the tape package further comprising: a brush having a handle end and a bristle end, wherein a length of the brush from the handle end to the bristle end is less than the diameter and the brush is in the interior space.

7. The tape package of clause 6, wherein the handle end of the brush comprises an arcuate edge.

8. A tape package comprising: a cylindrical roll core having an outer surface and an interior space; a first roll of an adhesive tape wound on the outer surface of the cylindrical roll core; and a second roll in the interior space, the second roll comprising a plurality of adhesive tape squares.

9. The tape package of clause 8, wherein the first roll of an adhesive tape has a first width and each adhesive tape square among the plurality of adhesive tape squares has a second width that is the same as the first width.

10. The tape package of clause 9, wherein each adhesive tape square among the plurality of adhesive tape squares is spaced-apart from another each adhesive tape square.

11. The tape package of clause 9, wherein each adhesive tape square among the plurality of adhesive tape squares is separated by perforations.

12. The tape package of clause 8, wherein the interior space has a diameter, the tape package further comprising: a brush having a handle end and a bristle end, wherein a length of the brush from the handle end to the bristle end is less than the diameter and the brush is in the interior space.

13. The tape package of clause 12, wherein the handle end of the brush comprises an arcuate edge.

14. The tape package of clause 12, wherein the brush comprises a finger guard opening.

15. A tape package comprising: a cylindrical roll core having an outer surface and an interior space; a first roll of an adhesive tape wound on the outer surface of the cylindrical roll core; and a second roll in the interior space, the second roll comprising a plurality of adhesive tape rectangles spaced-apart from one another on a non-adhesive backing.

16. The tape package of clause 15, wherein each adhesive tape rectangle among the plurality of adhesive tape rectangles is a square.

17. The tape package of clause 16, wherein the first roll of the adhesive tape has a first width and each adhesive tape square among the plurality of adhesive tape squares has a second width that is the same as the first width.

18. The tape package of clause 15, wherein the interior space has a diameter, the tape package further comprising: a brush having a handle end and a bristle end, wherein a length of the brush from the handle end to the bristle end is less than the diameter and the brush is in the interior space.

19. The tape package of clause 18, wherein the handle end of the brush comprises an arcuate edge.

20. The tape package of clause 19, wherein the brush comprises a finger guard opening.

2. Example Embodiments

In embodiments, nested tape rolls may be efficiently packaged and may include cut or perforated rectangles or squares of tape. One roll of tape may be wrapped around a cylindrical tape roll core, and another roll of tape may be packaged in the interior of the tape roll core such that the rolls of tape are nested or concentric. Additionally, or alternatively, a painting tool, such as a brush, scraper, burnishing tool, rag, or sponge, may be stored or carried in the interior of the tape roll core.

FIG. 1A illustrates a side view of nested tape rolls in an embodiment. In the example of FIG. 1A, a tape roll package 100 has an outer tape roll 102 and an inner tape roll 104. In an embodiment, the outer tape roll 102 and the inner tape roll 104 may each have circular cross sections and may be cylindrical or tubular. In other embodiments, the outer tape roll 102 and the inner tape roll 104 may each have other cross sections, such as a polygonal shape. In an embodiment, the outer tape roll may have an interior space 108 within the cross-section of the outer tape roll 108. In an embodiment, the outer tape roll 102 may comprise a roll core 106. In an embodiment, the roll core 106 may have a shape corresponding to that of the outer tape roll. For example, in an embodiment where the outer tape roll 102 is cylindrical, the roll core 106 may also be cylindrical. In an embodiment, the roll core may comprise cardboard, plastic, paper, or another material. In an embodiment, the outer tape roll 102 may comprise outer tape wrapped around the roll core 106.

In an embodiment, the outer tape of the outer tape roll 102 may comprise a length of flexible material, such as paper, plastic, or fabric, with an adhesive backing. The outer tape may have a length much longer than the circumference of the roll core 106 such that the outer tape wraps around the roll core 106 many times. In an embodiment, the outer tape may have a length of 40 yards (36.576 meters), 60 yards (54.86 meters), or 80 yards (73.15 m), 50 meters (54.68 yards), 100 meters (109.36 yards), etc. In other embodiments, the outer tape may have a length of less than 40 yards, between 40 yards and 60 yards (36.576 meters), between 60 yards (54.86 meters) and 80 yards (73.15 meters), or greater than 80 yards (73.15 meters). The preceding measurements of length are merely examples, and any useful length may be implemented.

In an embodiment, the interior tape roll 104 may be within or inside the interior space 108. In an embodiment, the inner tape roll 104 may comprise a plurality of rectangular or square tape pieces. In an embodiment, the inner tape roll may be wrapped around an interior surface of the roll core 106. In another embodiment, the inner tape roll 104 may be wrapped around an additional roll core (not shown), and the inner tape roll 104 and the additional roll core may be nested within the interior space 108. In an embodiment, the outer tape roll 102, the inner tape roll 104, the roll core 106, and/or the additional roll core may be concentric.

In another embodiment, additional tape rolls may be inside the interior space 108. The interior tape roll 104 may surround an additional tape roll. The additional tape roll may surround further tape rolls. In an embodiment, the additional tape rolls may be concentric with the outer tape roll 102, the inner tape roll 104, the roll core 106, and/or the additional roll core.

Any of the embodiments described above for FIG. 1A and the other drawing figures can form one part of a finished product package suitable for shipment or carriage in the channels of distribution and/or displayed, offered, or sold at wholesale or retail. For example, the elements described herein, in any embodiment, can be packaged using a blister pack having a cardstock carrier sheet and a pre-formed plastic bubble or cavity that covers the elements that have been described; a bag, alone or in combination with a tag or hanger; a clam pack; or other suitable packaging.

Figure 1B:
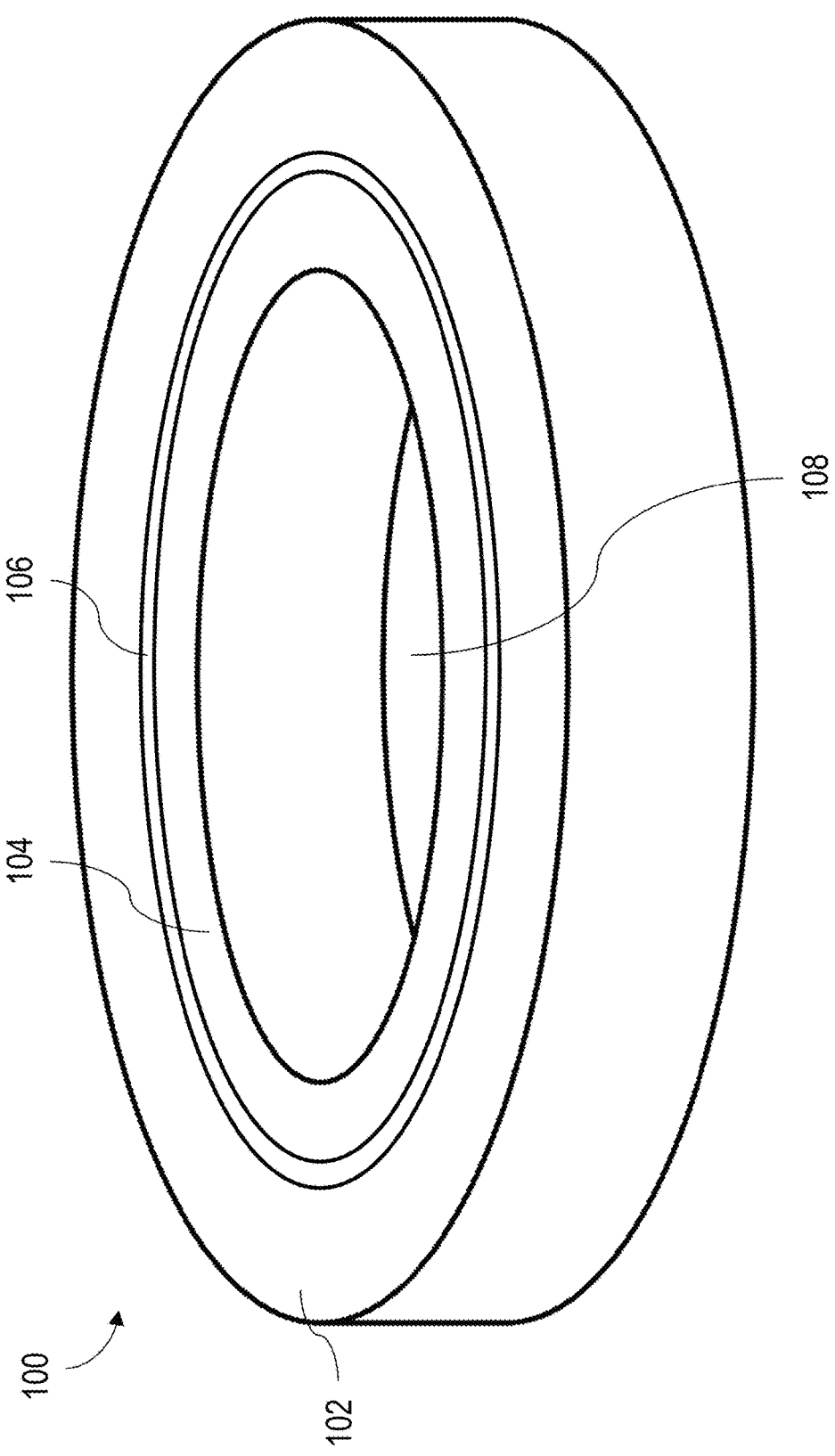
FIG. 1B illustrates a perspective view of nested tape rolls in an embodiment.

FIG. 1B illustrates a perspective view of nested tape rolls in an embodiment. In the example of FIG. 1B, the outer tape of the outer tape roll 102 may have a width that matches a common tape width. In an embodiment, the outer tape may have a width of 0.94 inches (2.39 centimeters), 1.41 inches (3.58 centimeters), or 1.88 inches (4.78 centimeters). In other embodiments, the outer tape may have a width of less than 0.94 inches (2.39 centimeters), between. 94 inches (2.39 centimeters) and 1.41 inches (3.58 centimeters), between 1.41 inches (3.58 centimeters) and 1.88 inches (4.78 centimeters), or greater than 1.88 inches (4.78 centimeters).

In an embodiment, the roll core 106 may have a width that is equal to the width of the outer tape. The width of the outer tape of the outer tape roll 102 may overlap the width of the roll core 106. In another embodiment, the roll core may have a width that is slightly greater than the width of the outer tape such that when the outer tape is wrapped around the roll core, the roll core protrudes slightly from the sides of the outer tape roll 102.

In an embodiment, the inner tape roll 104 may have a width that is equal to the width of the outer tape and/or the roll core 106. The width of the inner tape roll 104 may overlap the width of the outer tape and/or the roll core 106. In an embodiment, the inner tape roll may comprise a plurality of adhesive segments. In an embodiment, the plurality of adhesive segments may be squares or rectangles that each have a width that is equal to the width of the outer tape and/or the roll core 106.

Figure 2A:
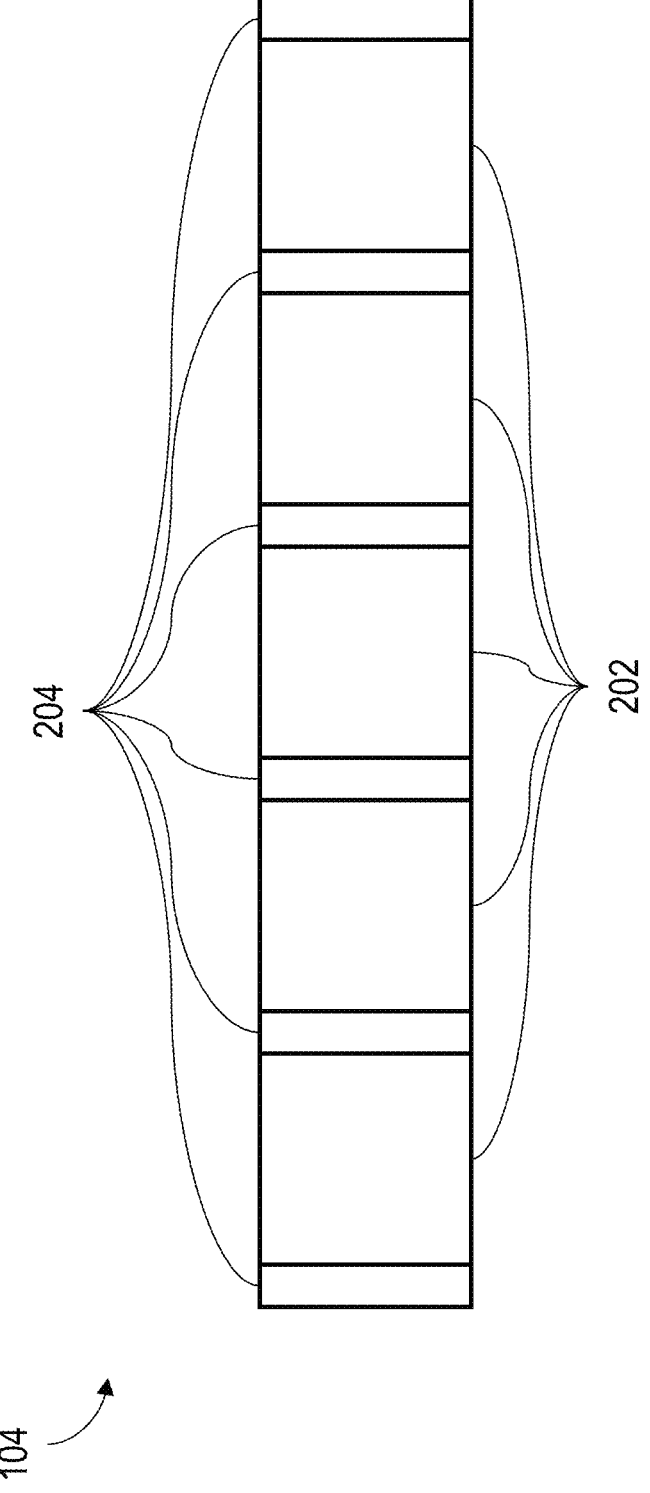
FIG. 2A illustrates a top view of a strip of spaced-apart adhesive segments in an embodiment.

FIG. 2A illustrates a top view of a strip of spaced-apart adhesive segments in an embodiment. In the example of FIG. 2A, the inner tape roll 104 comprises a plurality of adhesive segments 202 on a backing substrate 204. Each adhesive segment 202 may comprise a layer of flexible material such as paper, plastic, or fabric and a layer of adhesive material that couples the adhesive segment to the backing substrate 204. The backing substrate 204 may comprise a layer of flexible material such as paper, plastic, or fabric. In an embodiment, each segment may be spaced apart from adjacent segments. A spaced-apart arrangement may make it easier to remove individual adhesive segments from the backing substrate 204. In other embodiments, the backing substrate may be perforated between adhesive segments 202.

In an embodiment, the adhesive segments 202 may each have the same length. In an embodiment, the adhesive segments 202 may each have a length that is the same as the width of the outer tape roll 102, and the adhesive segments 202 may be squares. In another embodiment, the adhesive segments 202 may each have a length that is greater than the width of the outer tape roll 102. In one embodiment, the length corresponds to a dimension of a standard electrical junction box cover, such as a wall outlet plate or light switch plate. "Standard," in this context, can vary based on the country in which an embodiment is provided, used, sold, or shipped. In an embodiment, the length may be 4.5 inches (11.43 centimeters). In other embodiments, the length may be 5 inches (12.7 centimeters). In other embodiments, the length may be less than 4.5 inches (11.43 centimeters), between 4.5 inches (11.43 centimeters) and 5 inches (12.7 centimeters), or greater than 5 inches (12.7 centimeters). In another embodiment, the adhesive segments 202 may each have a length that is less than the width of the outer tape roll 102.

In another embodiment, the adhesive segments 202 may each have one of several different lengths. The adhesive segments may alternate between square adhesive segments with a length that is the same as the width of the outer tape roll 102 and rectangular adhesive segments with a length that is greater than or less than the width of the outer tape roll 102. In an embodiment, the adhesive segments 202 may be ordered such that sets of two, three, four, or more than four square adhesive segments with a length that is the same as the width of the outer tape roll 102 may be followed by one or more rectangular adhesive segments with a length that is greater than or less than the width of the outer tape roll 102.

In embodiments in which multiple tape rolls are nested within the interior space 108, a first interior tape roll may have adhesive segments 202 that each have a first length and a second interior tape roll may have adhesive segments 202 that each have a second length. In other embodiments, multiple tape rolls may be nested in the interior space that have adhesive segments 202 of the same length or that have adhesive segments 202 in alternating or ordered sequences of varying lengths.

Figure 2B:
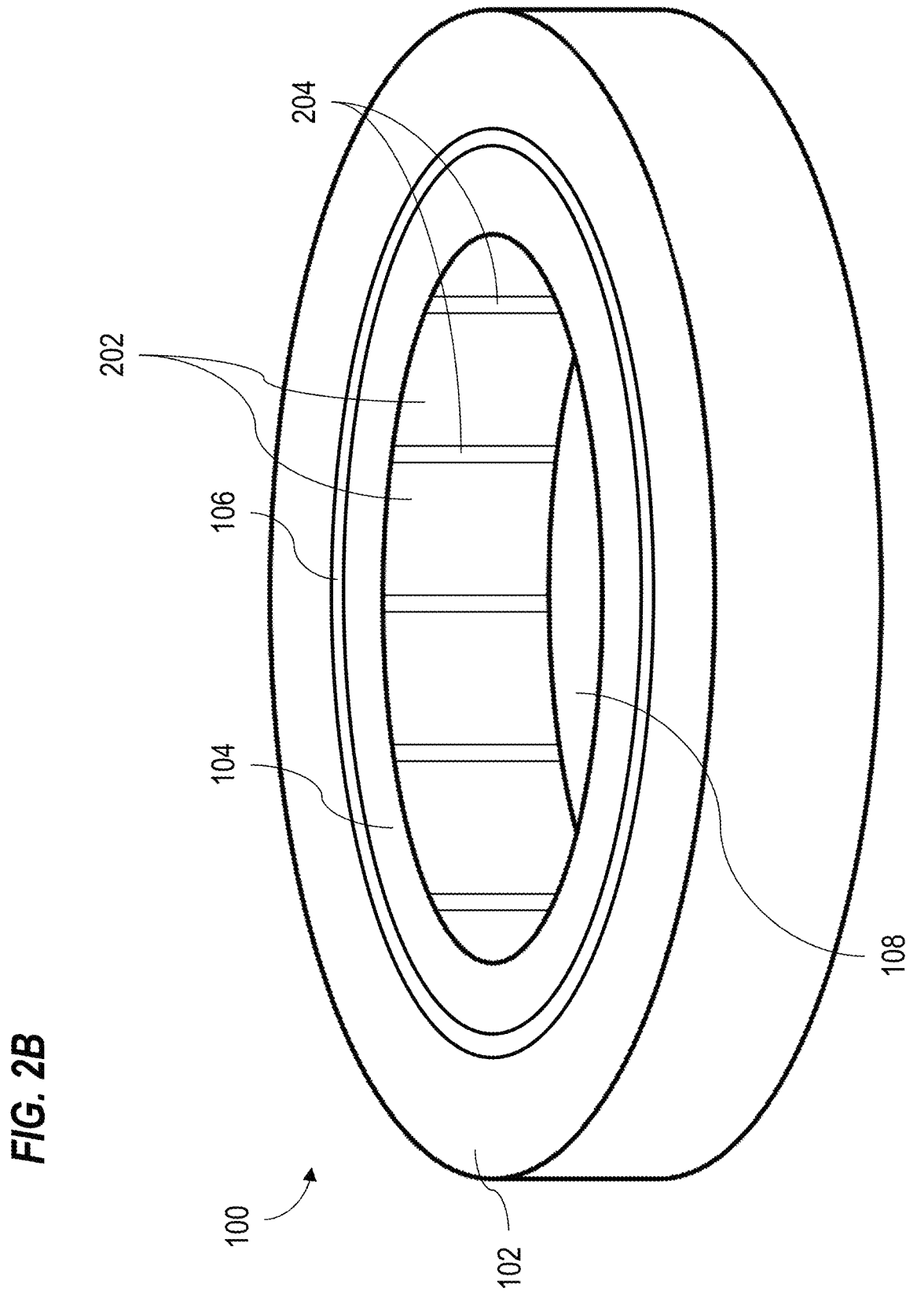
FIG. 2B illustrates a perspective view of nested tape rolls with spaced-apart adhesive segments in an embodiment.

FIG. 2B illustrates a perspective view of nested tape rolls with spaced-apart adhesive segments in an embodiment. In the example of FIG. 2B, the inner tape roll 104 is wound around an inner surface of the roll core 106 such that the plurality of adhesive segments 202 face the center of the tape roll package 100. In another embodiment, the inner tape roll 104 is wound around an inner surface of the roll core 106 or around an inner or outer surface of an additional roll core such that the plurality of adhesive segments 202 face the inner surface of the roll core 106.

Figure 3A:
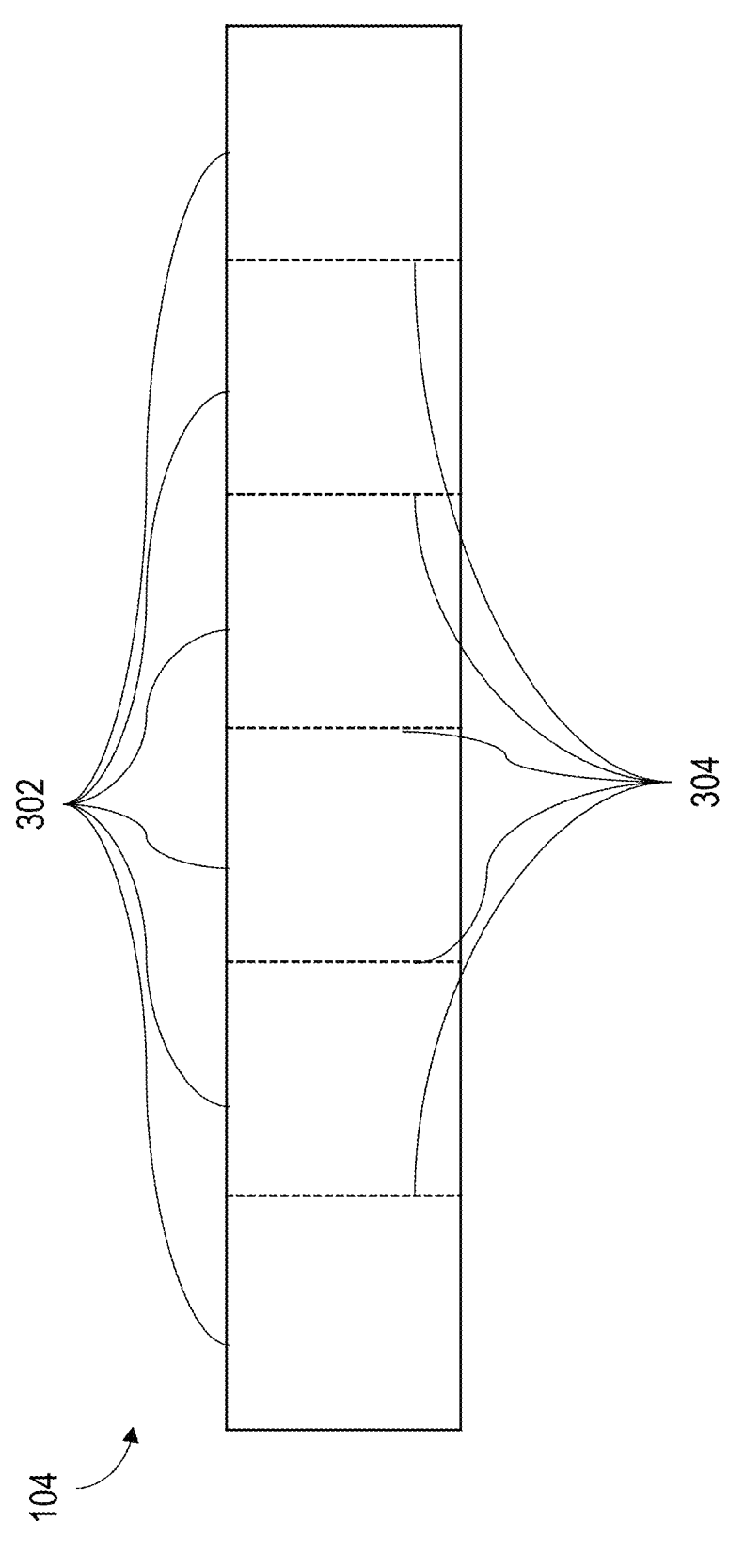
FIG. 3A illustrates a top view of a strip of tape with perforations.

FIG. 3A illustrates a top view of a strip of perforated tape. In the example of FIG. 3A, the inner tape roll 104 may comprise a perforated length of flexible material, such as paper, plastic, or fabric, with an adhesive backing. The inner tape roll 104 may have perforations 304 along lines that define a plurality of adhesive segments 302. Individual segments can be separated from the inner tape roll 104 along the perforations 304.

In another embodiment, the inner tape roll 104 may comprise the plurality of adhesive segments 302 on a backing substrate (not shown). Each adhesive segment 302 may comprise an upper layer of flexible material such as paper, plastic, or fabric and a layer of adhesive material that couples the adhesive segment to the backing substrate. The backing substrate may comprise a layer of flexible material such as paper, plastic, or fabric. Perforations 304 may extend through the upper layer of the inner tape roll 104, and the backing substrate may not be perforated. In another embodiment, Perforations 304 may extend through both the upper layer of the inner tape roll 104 and the backing substrate.

In an embodiment, the adhesive segments 302 may each have the same length. In an embodiment, the adhesive segments 302 may each have a length that is the same as the width of the outer tape roll 102, and the adhesive segments 302 may be squares. In another embodiment, the adhesive segments 302 may each have a length that is greater than the width of the outer tape roll 102. The length may correspond to a dimension of a standard electrical junction box cover, such as a wall outlet plate or light switch plate. In an embodiment, the length may be 4.5 inches (11.43 centimeters). In other embodiments, the length may be 5 inches (12.7 centimeters). In other embodiments, the length may be less than 4.5 inches (11.43 centimeters), between 4.5 inches (11.43 centimeters) and 5 inches (12.7 centimeters), or greater than 5 inches (12.7 centimeters). In another embodiment, the adhesive segments 302 may each have a length that is less than the width of the outer tape roll 102.

In another embodiment, the adhesive segments 302 may each have one of several different lengths. The adhesive segments may alternate between square adhesive segments with a length that is the same as the width of the outer tape roll 102 and rectangular adhesive segments with a length that is greater than or less than the width of the outer tape roll 102. In an embodiment, the adhesive segments 202 may be ordered such that sets of two, three, four, or more than four square adhesive segments with a length that is the same as the width of the outer tape roll 102 may be followed by one or more rectangular adhesive segments with a length that is greater than or less than the width of the outer tape roll 102.

In embodiments in which multiple tape rolls are nested within the interior space 108, a first interior tape roll may have adhesive segments 302 that each have a first length and a second interior tape roll may have adhesive segments 302 that each have a second length. In other embodiments, multiple tape rolls may be nested in the interior space that have adhesive segments 302 of the same length or that have adhesive segments 302 in alternating or ordered sequences of varying lengths.

In embodiments in which multiple tape rolls are nested within the interior space 108, a first interior tape roll may have adhesive segments 202 on a backing substrate 204 and a second interior tape roll may have adhesive segments 302 separated by perforations 304.

Figure 3B:
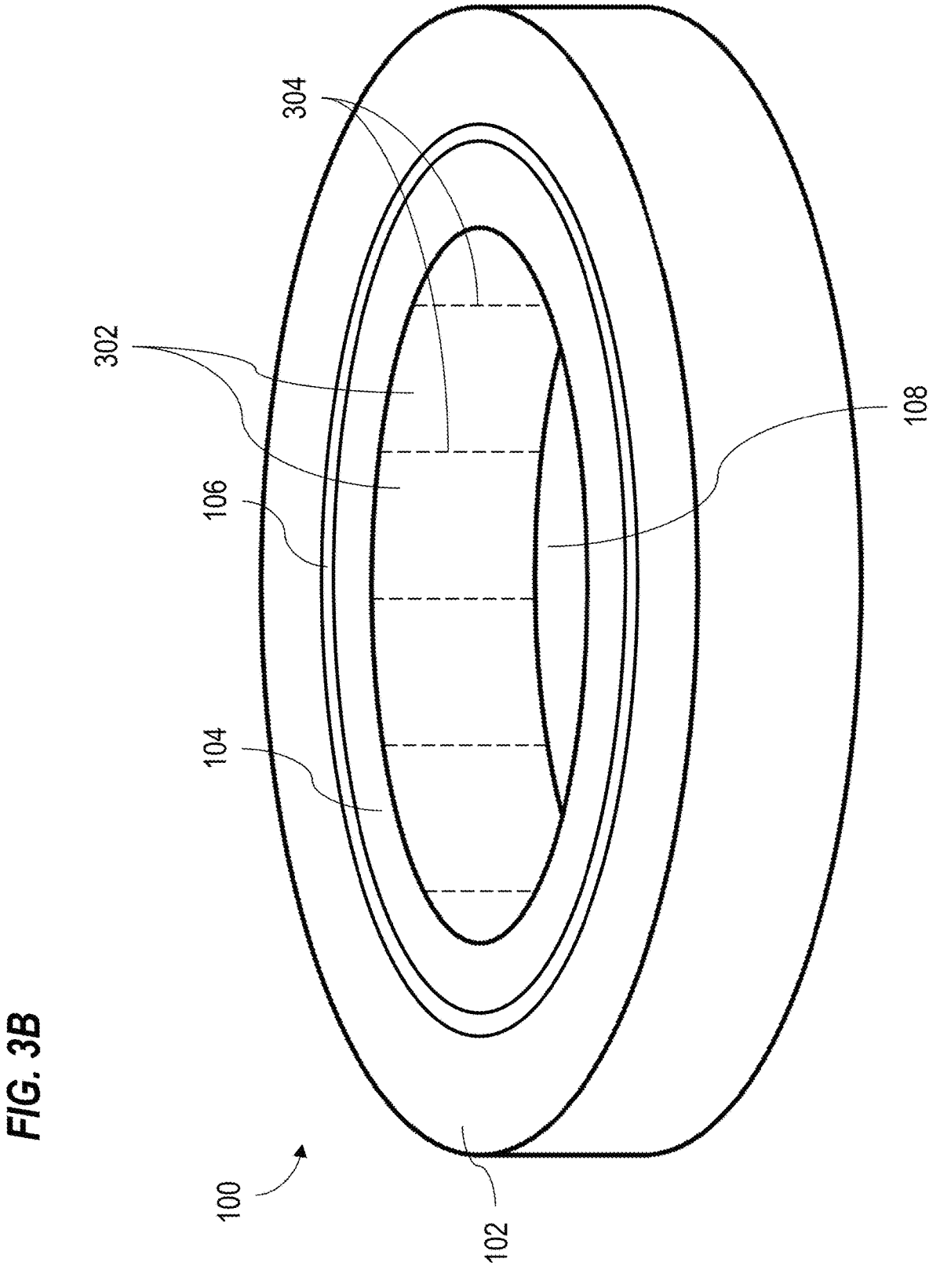
FIG. 3B illustrates a perspective view of nested tape rolls with perforations in an embodiment.

FIG. 3B illustrates a perspective view of nested tape rolls with perforated tape squares in an embodiment. In the example of FIG. 3B, the inner tape roll 104 is wound around an inner surface of the roll core 106 such that the plurality of adhesive segments 302 face the center of the tape roll package 100. In another embodiment, the inner tape roll 104 is wound around an inner surface of the roll core 106 or around an inner or outer surface of an additional roll core such that the plurality of adhesive segments 302 face the inner surface of the roll core 106.

Figure 4:
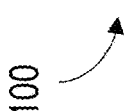
FIG. 4 illustrates a side view of a nested burnishing brush and nested tape rolls.

FIG. 4 illustrates a side view of a nested tool and nested tape rolls. In the example of FIG. 4, the interior space 108 contains both the inner tape roll 104 and a tool 402 such as a brush. In an embodiment, the tool 402 may be nested inside the inner tape roll 104, which is in turn nested inside the outer tape roll 102.

In various embodiments, the tool 402 can be any of a brush, scraper, burnishing tool, rag, or sponge. In one specific embodiment, tool 402 may be a burnishing brush and may have a bristle end 404 and a handle end 406. The tool 402 may be nested laterally in interior space 108 such that an entire length of the tool 402, from the bristle end 404 to the handle end 406, is contained in interior space 108. In other embodiments, the brush 402 may be nested at an angle or axially through the interior space 108.

In an embodiment, the bristle end 404 may comprise soft bristles. The bristle end 404, when dry, may used to burnish and compress a tape seam to reduce paint seepage. When used with paint, the soft bristles of the bristle end 404 may be less likely to push up a tape seam and allow paint to seep under applied masking tape or painters tape. In an embodiment, the tool 402 may be used to "cut-in," or apply paint along a strip of masking tape or painter's tape. In an embodiment, the bristle end 404 may comprise relatively short bristles and may hold less paint than other brushes. The reduced paint capacity of the bristles prevents the brush from applying too much paint to a paint seem, thereby preventing excess paint from seeping under applied masking tape or painter's tape. Another painting tool, such as a paint roller may be used to apply paint to the surface further from the strip of masking tape or painter's tape. In another embodiment, the tool 402 may be used to apply paint to an entire surface. In an embodiment, the bristles of the bristle end 404 may extend in a relatively straight line, such that they can reduce the difficulty of applying paint into corners or onto surfaces with right angles.

In an embodiment, the handle end 406 may comprise protrusions 410. The protrusions 410 may have pointed edges that are suitable for burnishing a strip of masking tape or painter's tape. When masking tape or painter's tape is applied to a surface, the tape may be burnished by applying pressure to the tape to seal the tape against the surface and prevent paint from intruding between the tape and the surface. The protrusions 410 may have pointed edges that can be used to apply pressure and burnish a tape seam. In an embodiment, when a tape seam runs against or along a corner, the tips or pointed edges of the protrusions 410 may be used to apply pressure and burnish a tape seam in the corner. In other embodiments, the protrusions 410 may have rounded or squared edges. The protrusions 410 may also prevent paint from dripping on a user's hand when gripping the handle end 406. In an embodiment, the protrusions 410 may extend a distance from the handle of tool 401 that is sufficient to cover a user's fingers and/or hand. In other embodiment, the protrusions 410 may extend from one side of interior space 108 to an opposite side of interior space 108. The protrusions 410 may extend across a diameter of the interior space 108 or may extend a shorter distance across interior space 108 along a line that does not pass through the center point of the interior space 108.

In an embodiment, the handle end 406 may comprise an arcuate edge. The arcuate edge may have a curvature that matches or is smaller than the interior curvature of the inner tape roll 104. The arcuate edge may allow the tool 402 to fit inside the interior space 108. The handle end may have a thickness that varies and may get thinner closer to the arcuate edge. The thinner thickness may form a pointed tip at the arcuate edge that may be used to apply pressure and burnish a tape scam.

In an embodiment, the bristle end 404 may comprise soft bristles to dry brush the tape seams to reduce paint seepage. In an embodiment, the arcuate edge of handle end 406 and the protrusions 410 can also be used to burnish difficult to reach tape seams, such as team seams in interior corners. The arcuate edge of handle end 406 and the protrusions 410 can also be used to apply greater pressure when burnishing tape seams.

In an embodiment, the handle end 406 may comprise a finger guard opening 408. The finger guard opening 408 may improve the ergonomics of the brush for both painting and burnishing tape seams. The finger guard opening 408 may increase the stability of the brush when a user is painting and burnishing tape seams.

3. Benefits, Improvements, and Scope

The embodiments described above and shown in the drawing views provide for an efficient packaging of pre-measured or cut tape segments that may be used with another roll of tape with a matching width. Unlike prior designs, the embodiments described above also efficiently packed tape and tools. The tools may have multiple uses, including but not limited to cleaning, prepping, painting, and burnishing tape seams.

The above-disclosed subject matter is to be considered illustrative and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:
1. A tape package comprising:
a cylindrical roll core having an outer surface and an interior space;
a first roll of an adhesive tape wound on the outer surface of the cylindrical roll core; and
a second roll in the interior space, the second roll comprising a plurality of adhesive tape rectangles on a non-adhesive backing, wherein each adhesive tape rectangle faces a center of the interior space.

2. The tape package of claim 1, wherein each adhesive tape rectangle among the plurality of adhesive tape rectangles is a square.

3. The tape package of claim 2, wherein the first roll of an adhesive tape has a first width, and each adhesive tape rectangle among the plurality of adhesive tape rectangles has a second width that is the same as the first width.

4. The tape package of claim 3, wherein each adhesive tape rectangle among the plurality of adhesive tape rectangles is spaced apart from another adhesive tape rectangle among the plurality of adhesive tape rectangles.

5. The tape package of claim 3, wherein each adhesive tape rectangle among the plurality of adhesive tape rectangles is separated from another adhesive tape rectangle among the plurality of adhesive tape rectangles by perforations.

6. The tape package of claim 1, wherein the interior space has a diameter, the tape package further comprising:

a brush having a handle end and a bristle end, wherein a length of the brush from the handle end to the bristle end is less than the diameter and the brush is in the interior space.

7. The tape package of claim 6, wherein the handle end of the brush comprises an arcuate edge.

8. A tape package comprising:

a cylindrical roll core having an outer surface and an interior space;

a first roll of an adhesive tape wound on the outer surface of the cylindrical roll core; and a second roll in the interior space, the second roll comprising a plurality of adhesive tape squares, wherein each adhesive tape square among the plurality of adhesive tape squares faces a center of the interior space.

9. The tape package of claim 8, wherein the first roll of an adhesive tape has a first width and each adhesive tape square among the plurality of adhesive tape squares has a second width that is the same as the first width.

10. The tape package of claim 9, wherein each adhesive tape square among the plurality of adhesive tape squares is spaced apart from another each adhesive tape square.

11. The tape package of claim 9, wherein each adhesive tape square among the plurality of adhesive tape squares is separated from another adhesive tape square among the plurality of adhesive tape squares by perforations.

12. The tape package of claim 8, wherein the interior space has a diameter, the tape package further comprising:

a brush having a handle end and a bristle end, wherein a length of the brush from the handle end to the bristle end is less than the diameter and the brush is in the interior space.

13. The tape package of claim 12, wherein the handle end of the brush comprises an arcuate edge.

14. The tape package of claim 12, wherein the brush comprises a finger guard opening.

15. A tape package comprising:

a cylindrical roll core having an outer surface and an interior space, wherein the interior space has a diameter;

a first roll of an adhesive tape wound on the outer surface of the cylindrical roll core; and a second roll in the interior space, the second roll comprising a plurality of adhesive tape rectangles spaced apart from one another on a non-adhesive backing, wherein each adhesive tape rectangle faces a center of the interior space.

16. The tape package of claim 15, wherein each adhesive tape rectangle among the plurality of adhesive tape rectangles is a square.

17. The tape package of claim 16, wherein the first roll of the adhesive tape has a first width and each adhesive tape square among the plurality of adhesive tape squares has a second width that is the same as the first width.

18. The tape package of claim 15, wherein the interior space has a diameter, the tape package further comprising:

a brush having a handle end and a bristle end, wherein a length of the brush from the handle end to the bristle end is less than the diameter and the brush is in the interior space.

19. The tape package of claim 18, wherein the handle end of the brush comprises an arcuate edge.

20. The tape package of claim 19, wherein the brush comprises a finger guard opening.

\* \* \* \* \*